(12) United States Patent
Genty et al.

(10) Patent No.: US 7,577,623 B2
(45) Date of Patent: Aug. 18, 2009

(54) METHOD FOR CONTROLLING RISK IN A COMPUTER SECURITY ARTIFICIAL NEURAL NETWORK EXPERT SYSTEM

(75) Inventors: Denise Marie Genty, Austin, TX (US); Shawn Patrick Mullen, Buda, TX (US); Bhargavi Bheemreddy Reddy, Austin, TX (US); Jacqueline Hegedus Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/110,846

(22) Filed: Apr. 28, 2008

(65) Prior Publication Data

US 2008/0229417 A1 Sep. 18, 2008

Related U.S. Application Data

(63) Continuation of application No. 11/334,671, filed on Jan. 18, 2006, now Pat. No. 7,461,036.

(51) Int. Cl.
*G06N 5/02* (2006.01)
*G06F 11/00* (2006.01)
(52) U.S. Cl. .......................................... 706/15; 726/25
(58) Field of Classification Search .................. 706/15; 726/25
See application file for complete search history.

(56) References Cited

U.S. PATENT DOCUMENTS

2004/0103058 A1 5/2004 Hamilton

OTHER PUBLICATIONS

"Internet Snoop Deceiver", IBM Research Disclosure 428117, Dec. 1999, pp. 1682.

Tsudik et al., "AudES—an Expert System for Security Auditing", http://sunsite.rediris.es/sites/ftp.cert.dfn.de/pub/docs/misc/audes/ps.gz, retrieved Sep. 23, 2005, pp. 1-9.

"RPC: Remote Procedure Call Protocol specification: Version 2", The Network Working Group, RFC 1057, Sun Microsystems, Inc., Jun. 1988, pp. 1-20.

Zhang et al., "Intrusion Detection Ssytem based on Fuzzy Defualt Logic", 2003, IEEE International Conference on Fuzzy Systems, pp. 1350-1356.

Axelsson, "Intrusion Detection Systems: A Survey and Taxonomy", 2000, Department of Computer Engineering, Chalmers University of Technology, Goteborg, Sweden, pp. 1-27.

McKay-Hubbard et al., "Models of Trust for Knowledge-Based Government Services", 2003, p. 307.

Dimmock et al., "Using Trust and Risk in Role-Based Access Control Policites", 2004, pp. 1-7.

*Primary Examiner*—David R Vincent
*Assistant Examiner*—Nathan H Brown, Jr.
(74) *Attorney, Agent, or Firm*—Yee & Associates, P.C.; Matthew W. Baca

(57) ABSTRACT

A computer implemented method, data processing system, and computer program product for monitoring system events and providing real-time response to security threats. System data is collected by monitors in the computing system. The expert system of the present invention compares the data against information in a knowledge base to identify a security threat to a system resource in a form of a system event and an action for mitigating effects of the system event. A determination is made as to whether a threat risk value of the system event is greater than an action risk value of the action for mitigating the system event. If the threat risk value is greater, a determination is made as to whether a trust value set by a user is greater than the action risk value. If the trust value is greater, the expert system executes the action against the security threat.

4 Claims, 3 Drawing Sheets

METHOD FOR CONTROLLING RISK IN A COMPUTER SECURITY ARTIFICIAL NEURAL NETWORK EXPERT SYSTEM

This application is a continuation of application Ser. No. 11/334,671, filed Jan. 18, 2006, status pending.

BACKGROUND OF THE INVENTION

1. Field of the Invention

The present invention relates generally to an improved data processing system, and in particular, to a computer implemented method, data processing system, and computer program product for monitoring system events and providing real-time response to security threats.

2. Description of the Related Art

An expert system is a computer program which solves problems using the knowledge and experiences of one or more human technical experts in a specific area of interest. The expert system comprises artificial intelligence software that mimics the decision-making ability of the human experts by relying on and manipulating large stores of expert knowledge in well-defined problem domains. Utilizing an expert system allows less-skilled individuals, who may not otherwise be able to perform tasks as proficiently without the aid of the expert system, to benefit from the knowledge base of the expert system. If the system comprises knowledge from multiple experts, an expert user may also benefit from using the expert system if the expert user wants to access the knowledge base of multiple expert humans in the specific area of interest. One example of an expert system is a rules-based system. In a rules-based system, rules may be applied to collected information to form conclusions.

In contrast with traditional computer programs of decision-making logic which imbed this decision-making logic in the program itself, an expert system relies on the knowledge in its knowledge-base. For example, pseudo code of a traditional decision-making program to drive a car is shown below. Note that all of the logic is imbedded in the code itself.

```
Switch ( the_car_near_me) {
    Slows: ...
    Stops: ...
    Turns:
        If( in_front_of_me)
            If ( will_I_crash(myspeed,distance_to_impact))
                If( there_is_a_car_next_to_me)
                    Break( );
                Else
                    Swerve( );
```

The tables below illustrate how the same problem is solved using a knowledge-based expert system. Note how the logic is in the rule base, events, and actions, which makes the code logic simplistic.

| Event Rule Base Table | | |
|---|---|---|
| Event Name | Parameters | ActionRequired |
| ImpendingImpact | TimeToImpact | Yes |

| Action Rule Base Table | | |
|---|---|---|
| Action Name | Preferred use rating | Event types |
| Brake | 7 | ImpendingImpact, Parking |
| Swerve | 5 | ImpendingImpact |

From the above events and actions, the programming decision logic for the expert system is reduced to the following:

```
AnEventOccured( event)
    If (event.ActionRequired)
        ApplyActionToEvent(event);
```

Thus, the programming logic using the expert system is greatly reduced by moving the knowledge from the program's code into the rule/knowledge base. Although the two approaches in the example above are functionally equivalent and solve the same basic problem, the expert system distinguishes itself from traditional computer programs of decision-making logic when adapting to change in the system and the expert system's ability to learn. For example, if a new technology was introduced to car safety called the ejection seat, the traditional programming decision-making logic code would need to be reviewed and changed wherever this new technology is applicable. In contrast, the expert system would simply create a new action in its rule base.

Thus, expert systems may allow users without special knowledge or expertise to perform specific tasks as proficiently as an expert user. For example, in response to an event, the expert system may need to apply an action or countermeasure to the event to mitigate the effects of the event on the system. As the non-expert users cannot configure or be involved in each and every decision of the expert system (because doing so would require expertise on the user's part), the expert system may be configured to perform the action automatically, or, in some situations, the expert system may be allowed to only perform the action upon receiving user input confirming the action. However, no existing expert system is present that provides a user with a general overall level of control over the actions to be taken by the expert system.

SUMMARY OF THE INVENTION

Aspects of the present invention provide a computer implemented method, data processing system, and computer program product for monitoring system events and providing real-time response to security threats. System data is collected by monitors in the computing system. The expert system of the present invention compares the data against information in a knowledge base to identify a security threat to a system resource in a form of a system event and an action for mitigating effects of the system event. A determination is made as to whether a threat risk value of the system event is greater than an action risk value of the action for mitigating the system event. If the threat risk value is greater, a determination is made as to whether a trust value set by a user is greater than the action risk value. If the trust value is greater, the expert system executes the action against the security threat.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
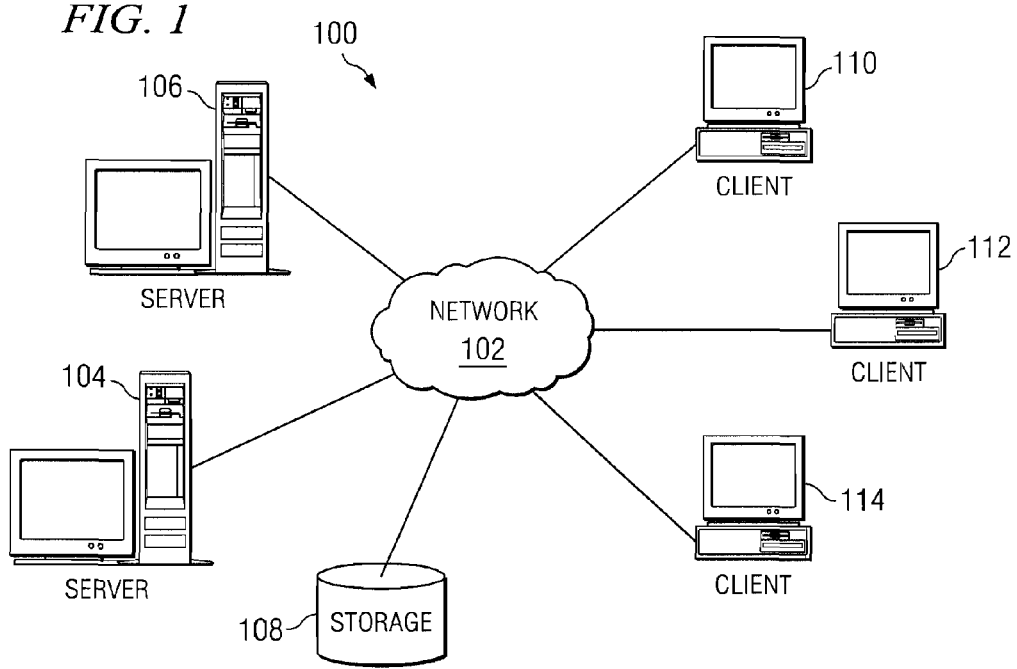
FIG. 1 depicts a pictorial representation of a distributed data processing system in which the present invention may be implemented.
Figure 2:
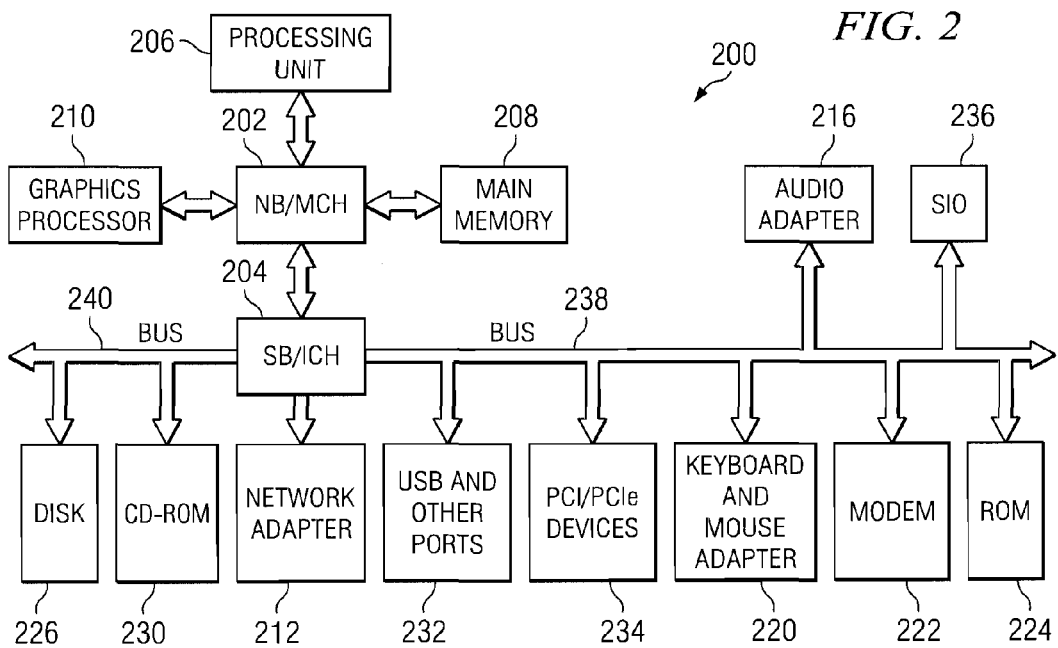
FIG. 2 is a block diagram of a data processing system in accordance with an illustrative embodiment of the present invention.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

In accordance with exemplary embodiments of the present invention, an expert system is provided for monitoring security events in a system and providing real-time response to security threats. The expert system of the present invention combines its knowledge of a computing system's configuration, security features, and threats, and stores this information in a knowledge database. The expert system continuously monitors the computing system to detect system events and identify potential security threats. Upon detecting a security threat, the expert system relies on the knowledge base to determine if a countermeasure needs to be implemented against the potential security threat. The actual implementation of the countermeasure is dependent upon whether the expert system is authorized by the system administrator to take action to combat the security threat.

Central to the expert system of the present invention is the notion that a computer system may be categorized broadly. For example, the expert system may classify a computer system into categories of resources, events, monitors, and actions. These broad system categories may be further defined as elements, which may be linked in detail. For instance, a resource is a component of a computing system which needs protection. Elements found in the resource category may include processes, network ports, file systems, and data hardware, and the like. An event is any occurrence to the system which may threaten a resource. Monitors are active daemons or code embedded in the system which detect and report risks to resources. Actions are system changes implemented by the expert system which mitigate the event threatening the resource. Events are reported to the expert system by monitors, events imply risk to resources, events require a decision on the appropriate action, and actions protect resources.

Figure 3:
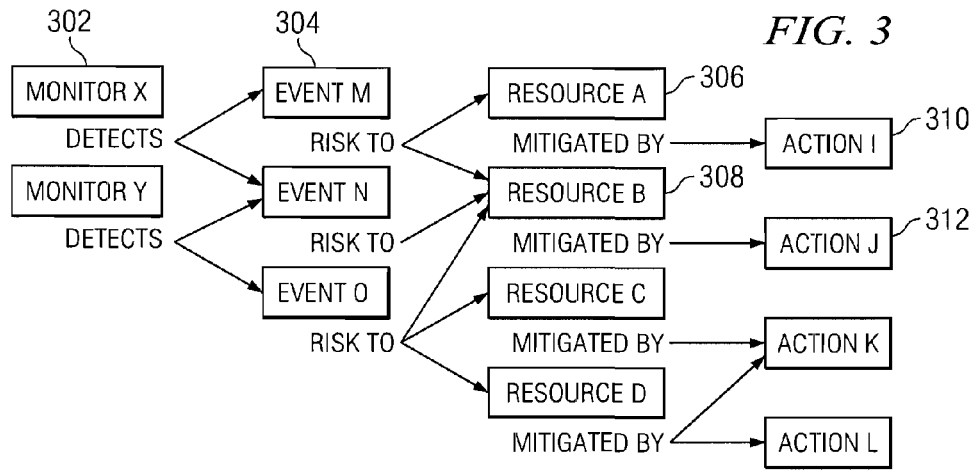
FIG. 3 is a diagram illustrating relationships among computer system categories in accordance with an illustrative embodiment of the present invention.

FIG. 3 is a diagram illustrating example relationships among categories in accordance with an illustrative embodiment of the present invention. These relationships may be stored in a knowledge base, which is further described in FIG. 4 below. In this illustrative example, monitor 302 detects an event, such as event M 304. The expert system determines that the occurrence of event M 304 may cause a risk to system resources, such as resource A 306 and resource B 308. To combat the risk to resource A 306, the expert system may take an action, such as action I 310, to mitigate the risk of event M 304. Likewise, the expert system may take action J 312 to mitigate the risk of event M 304.

An event is created from some stimulus, for example, an attempt to open access to the network, such as when a process opens a listen socket on a port. All events have an associated security threat risk. The security threat risk value of an event reflects the potential threat the occurrence of the event may have on the system. For example, the threat risk is high if the event would give privileged access to an unauthorized user. The measure of an event's threat risk may be an integer between 0 and 10.

An action is the change to the system's security configuration in response to an event. All actions have an associated action risk, and the risk of performing an action may outweigh the security threat risk of the event. In the cases where the action risk is greater, the inference engine in the expert system would infer that no action be taken for that particular event. For example, if the action could deny access to valid users, then the action risk is high. The measure of an action's risk may be an integer between 0 and 10.

The expert system of the present invention provides an advantage over existing systems by allowing a system administrator to configure a level of trust to the entire artificial intelligence system. A trust value is used to indicate the authorization or trust the system administrator has placed in the expert system. For example, the system administrator may abdicate the security entirely to the expert system by assigning the expert system a high trust value, or give little trust to the system by assigning a low trust value to the system, knowing that the system administrator's own personal configuration setting will suffice. The trust value is a single configuration value entered by the system administrator, which simplifies the expert system configuration. The expert system of the present invention first weighs the gravity of the risk of a security threat, registered as an event, against the risk of the action to be taken to combat the security threat. If the threat risk is determined to be greater than the risk of the action, the expert system determines that the action should be performed. However, the expert system then compares the risk of the action against the trust level set by the system administrator. If the action risk value falls within the trust level (e.g., the action risk value is equal to or below the assigned trust value), then the action will be taken. Otherwise, if the action risk value does not fall within the trust level (e.g., the action risk value is above the assigned trust value), then the system administrator does not have confidence in the decision the expert system has made to take action to combat a perceived threat, and thus the expert system does not take action.

For example, the system administrator sets a trust value of 5 for all decisions made by the expert system, wherein a trust value of 0 indicates the lowest level of confidence in the expert system's decisions, and a value of 10 indicates the highest level of confidence in the expert system's decisions. When a threat is detected with a threat risk value of 6, the expert system identifies a particular action to combat the threat, wherein the action has an assigned risk value of 2. The expert system calculates the difference between the threat risk value and action risk value. If the difference of the threat risk value minus the action risk value is above or equal to 0, the expert system determines the action should be taken. The expert system then determines whether the action risk value is equal to or is below the system administrator-defined trust level. In this case, as the action risk value (2) is below the system administrator's trust level (5), the security action to combat the threat will be taken by the expert system. Although the example above describes a simple mathematical model for balancing risk with a trust component, it should be noted that other more complex models may be used without departing from the spirit and scope of the present invention.

Thus, the mechanism of the present invention provides a user with the ability to configure trust in an expert system. This trust level permeates the decision-making processes of the expert system and is used by the user to mitigate risk in the expert system's decision processes. The trust level the user has placed in the decision-making processes of the expert system also may affect the amount and rate of learning of the expert system, because the expert system may establish its own trust in itself. In other words, the expert system establishes trust in its own conclusions. For example, a cellular telephone company provides a feature to its customers that allows a user to block certain numbers from being dialed from the user's own phone for a specified time period. One particular use of this feature is to prevent the user from dialing the numbers when the user is drunk. Thus, the user may block the number of user's boss before the user goes out drinking, because the user does not trust the user's own decisions to call the user's boss when the user is drunk.

Figure 4:
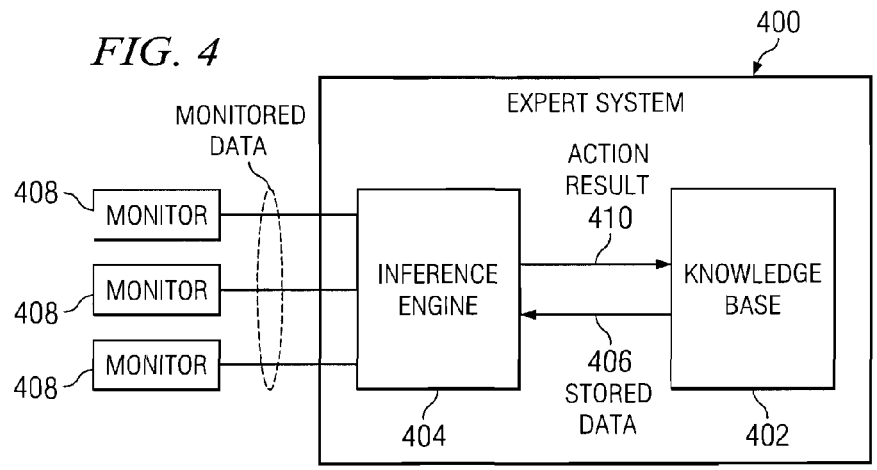
FIG. 4 is a block diagram of an exemplary expert system in accordance with an illustrative embodiment of the present invention.

FIG. 4 is a block diagram of an exemplary expert system in accordance with an illustrative embodiment of the present invention. Expert system 400 may be implemented in a data processing system, such as data processing system 200 in FIG. 2. In addition, the expert system architecture shown in FIG. 4 may be used for any expert system application involving computer or network vulnerability assessment. Expert system 400 may be used to generate conclusions or inferences about security threats to the computing system. As previously mentioned, an expert system is an artificial intelligence application that uses a knowledge base of human expertise for problem solving.

In this illustrative example, expert system 400 includes knowledge base 402 and inference engine 404, which together form an intelligent security threat response tool used to detect potential security threats and react to these potential threats by performing an associated action. Knowledge base 402 comprises knowledge, such as data in a database, as well as relationships among the data in the form of rules. Inference engine 404 may derive conclusions regarding system events using input (stored data 406) from knowledge base 402. Knowledge base 402 also includes the ability to update itself through usage. Knowledge base 402 may be maintained by a system administrator or by a third party for use by administrators. In some cases, the third party may be a vendor or group of vendors.

Inference engine 404 comprises programmatic logic and rules. The programmatic logic of the inference engine may be kept to minimum, as its function is to interpret the rules. The rules are applied to balance the risks of the events, actions, and the control entrusted to the expert system by the system administrator. The system administrator may use a simple configuration setting in the form of a power and control or trust value, which indicates how much control is entrusted to the expert system to change and protect the system. The programmatic logic of the inference engine weighs the gravity of the risk of the event's security threat against the risk of the action to be taken. The programming logic also weighs the difference between the security threat risk and the risk of the action to be taken against the trust value. The power and control setting or trust value may be an integer between 0 and 10. The system administrator may set this trust value during the initial configuration of expert system. If the system administrator chooses a high level of security, the system control and power value is set to 10. A medium and low security level will yield a system power and control value of 5 and 0, respectively.

Monitoring components, such as, for example, network sniffer detection or port scanners, may be placed at various points in the computing system. Monitoring components (monitors 408) are used to obtain information regarding system activity. Information from monitors 408 is supplied to inference engine 404 in expert system 400. Inference engine 404 applies the obtained data against knowledge base 402. If the inference engine 404 determines that an event in the monitored data is a potential security threat, the inference engine 404 responds to the security threat by performing a counter measure (action) associated with the detected security event.

There are risk values associated with the security event and the action: the risk the occurrence of the event (perceived security threat) will have upon system resources, and the risk associated with the action employed against the threat. A system administrator may assign an initial threat risk value to a threat that may occur in a monitored area. An initial threat risk rates the threat from a low vulnerability to a high vulnerability, and may be in integer between 0 and 10. In addition, for each potential threat, the system administrator may assign an action risk value for each countermeasure used to counter act the threat, since each countermeasure taken against a threat has an inherent risk. For example, if a threat is detected in monitored port 2, an action taken against the threat may involve a configuration change, such as preventing unauthorized access to the port by blocking network traffic. However, if the perceived threat is a false alarm and the expert system takes action by blocking access to the port, then the taken action itself may cause harm and have negative effects on system accessibility or performance. If the perceived threat is not a false alarm and the expert system does not take any action against the threat, then the threat could compromise the system or deny service.

The system administrator may assign the initial threat risk values and the action risk values in knowledge base 402. However, the assigned threat and risk values are not static or hard coded values, as these values may be updated by the expert system itself. For instance, knowledge base 402 in expert system 400 may be updated in a recurrent artificial network loop. For example, when the expert system performs an action, the system is monitored to determine the success of the action. This action result 410 is entered back into knowledge base 402. (In addition, if there is a negative effect to the action, an event is generated and processed by the inference engine.) The knowledge base intelligently identifies which events and actions are affected by the update. Thus, the action results from previous events are taken into account when the expert system derives a conclusions regarding how the current threat should be handled. In this manner, the expert system may consider all factors as a whole when the expert system makes a decision on how to handle subsequent threats.

Figure 5:
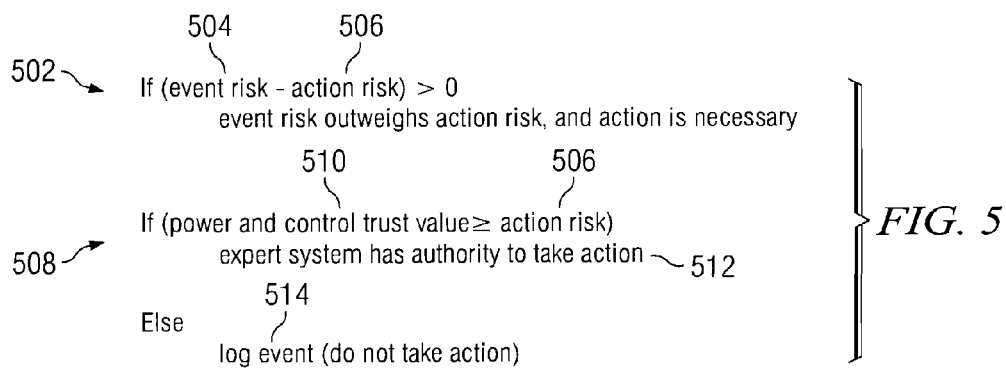
FIG. 5 is a diagram illustrating the core programming logic of the security inference engine in accordance with an illustrative embodiment of the present invention.

FIG. 5 is a diagram illustrating the core programming logic of the security inference engine in accordance with an illustrative embodiment of the present invention. The security inference engine logic shown in FIG. 5 may be implemented in an inference engine, such as inference engine 404 in FIG. 4. The programming logic may be executed when the monitoring components, such as monitors 408 in FIG. 4, alert the expert system to a potential security threat in the form of an event.

The inference engine uses the monitored data and the information in the knowledge base to identify if an action should be taken in response to a security threat. As shown in step 502, the programming logic of the inference engine determines whether the threat risk of the event (event risk 504) is greater than the risk of the action (action risk 506) to be taken to combat the threat. If the threat risk of the event is greater than the action risk ((event risk−action risk)>0), the inference engine concludes that the action is necessary and should be taken. If the risk of taking the action is greater than the actual threat risk posed by the event, the action will not be taken.

Upon concluding that an action should be taken, the inference engine may execute the action based on the trust level the system administrator has placed in the expert system. For example, in step 508, the power and control trust value set by the system administrator (power and control trust value 510) is compared against the risk value of taking the necessary action (action risk 506). If the power and control trust value is greater than or equal to the action risk, the expert system has the authority to take the necessary action 512. Thus, the system administrator may entrust the expert system to change and protect the system through the action. In contrast, if the action risk value is greater than power and control trust value, the expert system does not take action, but rather just logs the event 514.

Figure 6A:
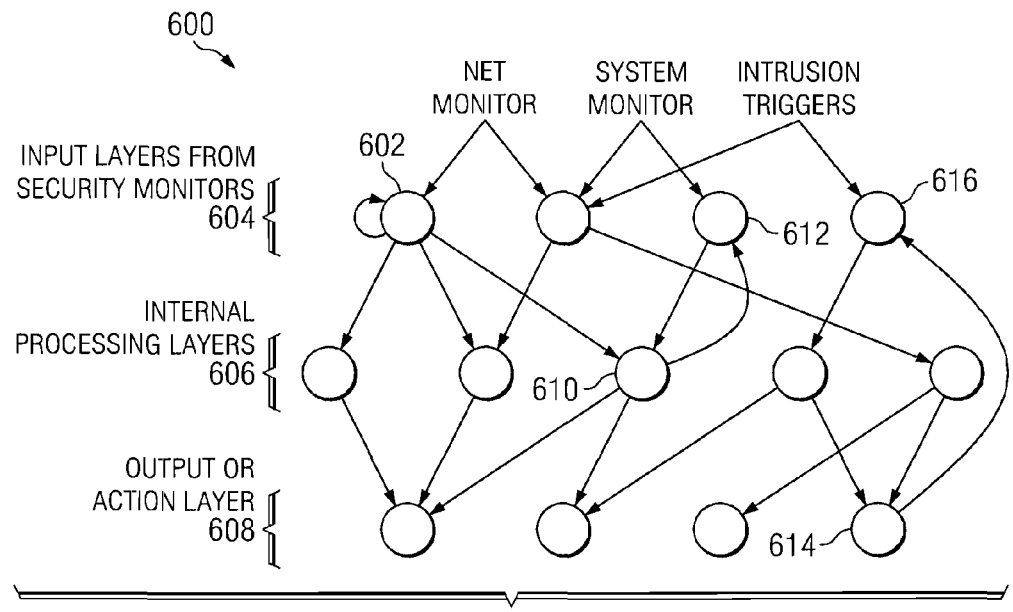
FIG. 6A is a diagram of an exemplary artificial neural network (ANN) expert system in accordance with an illustrative embodiment of the present invention.

FIG. 6A is a diagram of an exemplary artificial neural network (ANN) expert system in accordance with an illustrative embodiment of the present invention. Artificial neural network expert system 600 provides an information processing system based on the way biological nervous systems, such as the brain, process information. Like humans, an artificial neural network learns by example. Artificial neural network expert system 600 is configured to provide real-time response to security threats through a learning process. Artificial neural network expert system 600 may be implemented in a data processing system, such as data processing system 200 in FIG. 2.

In this illustrative example, artificial neural network expert system 600 comprises a plurality of interconnected processing elements or artificial neurons, such as artificial neuron 602. Artificial neurons are the basic components of an artificial neural network, and are used to perform certain processes, which will be described further in below in FIG. 6B.

Artificial neural network expert system 600 comprises layers of elements. In particular, artificial neural network expert system 600 includes input layers 604, internal processing layers 606, and output layers 608. Input layers 604 comprise artificial neurons which receive data from monitoring components in the system, such as monitors 408 in FIG. 4. The various monitoring components may include network monitors, system monitors, and intrusion triggers. When the neurons in input layers 604 perform their functions on the data, the output of input layers 604 is provided to internal processing layers 606. Internal processing layers 606 comprise artificial neurons having inputs and outputs connected to other neurons. Neurons in internal processing layers 606 perform their functions on the data received from input layers 604, and then provide the output to neurons in output layers 608. Output from output layers 608 provides actions that may be performed by the expert system to combat a detected security threat.

Feedback connections in the form of simple recurrent network (SRN) loops may also be provided among the plurality of neurons in each layer, such that the output of one layer is routed back to a previous layer. For example, the output of neuron 602 in input layer 604 is routed back to itself, the output of neuron 610 in internal processing layer 606 is routed back to neuron 612 in input layer, and the output of neuron 614 in output layer 608 is routed back to neuron 616 in input layer 604. These SRN loops allow the artificial neural network to learn from itself, and thus allow for improved decision-making in response to detected security threats.

Figure 6B:
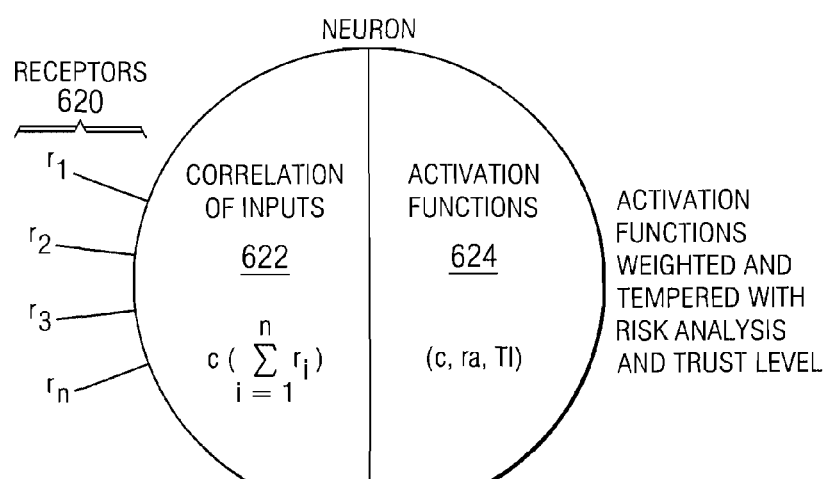
FIG. 6B is a detailed view of an artificial neuron in accordance with an illustrative embodiment of the present invention.

FIG. 6B provides a more detailed view of an artificial neuron, as previously described in FIG. 6A. Inputs, such as input from receptor rl 620, are received by artificial neuron 622. The inputs received are correlated, or simply summed. The correlated input is fed through activation functions to generate a result. Activation functions 624 may weigh the risk of the security threat and the action needed to mitigate the threat, and temper the expert system's decision to execute and action based on the trust level the system administrator has placed in the decision-making ability of the expert system. In this manner, the trust level the system administrator assigns to the expert system is used to temper the action, reaction, learning, and decision process of the artificial neural network.

Thus, the present invention solves the disadvantages of the prior art by providing an expert system that monitors system events and provides real-time response to security threats. The mechanism of the present invention simplifies the tasks of a system administrator by providing a rules-based expert system that combines its knowledge of the system's configuration, security features, and threats with information obtained from monitoring the system to provide a proactive response to a detected security threat. The expert system of the present invention weighs the gravity of the risk of a security threat against the risk of the action to be taken to combat the security threat. The expert system of the present invention also weighs the action risk against a trust value set by the system administrator, which describes how much control is entrusted to the expert system to change and protect the system. For a necessary action, the expert system may take action if the trust value set by the system allows the expert system to take action.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system is suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for providing real-time response to security threats comprising:
   a bus;
   a storage device connected to the bus, wherein the storage device contains computer usable code;
   at least one managed device connected to the bus;
   a communications unit connected to the bus; and
   a processing unit connected to the bus, wherein the processing unit executes the computer usable code to receive data collected by a system monitor; to process the received data using a security threat response tool that includes: a knowledge base that associates security threat events with system resources and further specifies responsive actions that may be undertaken in response to the security threat events, wherein each of the security threat events has an associated security threat risk; and an inference engine that includes rules for determining whether to initiate a responsive action, said processing the received data comprising: to compare the received data against information in the knowledge base to identify a security threat value, wherein the security threat event is associated within the knowledge base with a system resource and an associated responsive action having an associated action risk value; to compare the associated security threat risk value to the associated action risk value; to determine whether a user configured trust component is greater than the associated action risk value response responsive to the associated security threat risk value being greater than the associated action risk value, wherein the user configured trust component specifies a level of trust assigned by the user, wherein the user configured trust component is a single configuration value set by a system administrator for the security threat response tool; and to implement the associated responsive action responsive to determining that the user configured trust component is greater than the associated action risk value.

2. The data processing system of claim 1, wherein the processing unit further executes the computer usable code to log the security threat event without implementing the associated responsive action in response to one of determining that the associated security threat risk value is not greater than the associated action risk value or determining that the user configured trust component is not greater than the associated action risk value.

3. A computer program product for providing real-time response to security threats comprising:
   a computer usable medium having computer usable program code tangibly embodied thereon, the computer usable program code comprising:
   computer usable program code for receiving data collected by a system monitor;
   computer usable program code for processing the received data using a security threat response tool that includes:
      a knowledge base that associates security threat events with system resources and further specifies responsive actions that may be undertaken in response to the security threat events, wherein each of the security threat events has an associated security threat risk; and
      an inference engine that includes rules for determining whether to initiate a responsive action,
   said processing the received data comprising:
      computer usable program code for comparing the received data against information in the knowledge base to identify a security threat event having an associated security threat risk value, wherein the security threat event is associated within the knowledge base with a system resource and an associated response action having an associated action risk value;
      computer usable program code for comparing the associated security threat risk value to the associated action risk value;
   computer usable program code for determining whether a user configured trust component is greater than the associated action risk value responsive to the associated security threat risk value being greater than the associated action risk value, wherein the user configured trust component specifies a level of trust assigned by the user, wherein the user configured trust component is a single configuration value set by a system administrator for the security threat response tool; and
   computer usable program code for implementing the associated responsive action responsive to determining that the user configured trust component is greater than the associated action risk value.

4. The computer program product of claim 3, further comprising: computer usable program code for logging the security threat event without implementing the associated responsive action in response to one of determining that the associated security threat risk value is not greater than the associated action risk value or determining that the user configured trust component is not greater than the associated action risk value.

* * * * *